(12) United States Patent
Thompson et al.

(10) Patent No.: US 8,898,787 B2
(45) Date of Patent: Nov. 25, 2014

(54) SOFTWARE VULNERABILITY EXPLOITATION SHIELD

(75) Inventors: Roger John Thompson, Marietta, GA (US); Gregory Andrew Mosher, Roswell, GA (US)

(73) Assignee: AVG Netherlands, B.V., Amsterdam (NL)

( * ) Notice: Subject to any disclaimer, the term of this patent is extended or adjusted under 35 U.S.C. 154(b) by 61 days.

(21) Appl. No.: 11/691,094

(22) Filed: Mar. 26, 2007

(65) Prior Publication Data

US 2007/0226797 A1    Sep. 27, 2007

Related U.S. Application Data

(60) Provisional application No. 60/785,723, filed on Mar. 24, 2006.

(51) Int. Cl.
*H04L 29/06* (2006.01)
*G06F 21/55* (2013.01)

(52) U.S. Cl.
CPC ............ *H04L 63/1416* (2013.01); *G06F 21/55* (2013.01); *H04L 63/166* (2013.01)
USPC ......................................................... 726/24

(58) Field of Classification Search
CPC .................................................... G06F 21/56
USPC .......................................................... 726/24
See application file for complete search history.

(56) References Cited

U.S. PATENT DOCUMENTS

| 7,197,762 | B2 * | 3/2007 | Tarquini | ............................. | 726/3 |
| 7,266,845 | B2 * | 9/2007 | Hypponen | ...................... | 726/24 |
| 7,308,714 | B2 * | 12/2007 | Bardsley et al. | ................ | 726/23 |
| 2003/0084329 | A1 | 5/2003 | Tarquini | | |
| 2003/0126472 | A1 | 7/2003 | Banzhof | | |
| 2004/0015719 | A1 * | 1/2004 | Lee et al. | ....................... | 713/201 |
| 2004/0044912 | A1 * | 3/2004 | Connary et al. | .............. | 713/201 |
| 2005/0091518 | A1 | 4/2005 | Agarwal et al. | | |

(Continued)

FOREIGN PATENT DOCUMENTS

CN    200410087012    5/2005
JP    2004-139177 A    5/2004

(Continued)

OTHER PUBLICATIONS http://web.archive.org/web/20010201210800/http://whitehats.com/ids/index.html, 2000, Max White's "Whitehats.com".*

(Continued)

*Primary Examiner* — Harris Wang
(74) *Attorney, Agent, or Firm* — Pepper Hamilton LLP (57) ABSTRACT

This paper describes a mechanism for minimizing the exploitation of vulnerabilities on software installed on a computing system. At a transport layer (e.g., transmission communication protocol (TCP) sockets layer), network traffic is monitored using a security component installed on a target computer. When a message destined for the computing system is received, data included in the message is compared with exploit evidence used to identify malicious code. The exploit evidence is provided to the security component by security service that gathers information about the malicious code. Based on the comparison of data in the message with the exploit evidence, rules are identified that instruct the security component to take an appropriate action on the message received.

14 Claims, 2 Drawing Sheets

(56) References Cited

U.S. PATENT DOCUMENTS

| | | | |
|---|---|---|---|
| 2005/0108393 A1* | 5/2005 | Banerjee et al. | 709/225 |
| 2005/0125694 A1* | 6/2005 | Fakes et al. | 713/201 |
| 2005/0283837 A1* | 12/2005 | Olivier et al. | 726/24 |
| 2006/0036718 A1 | 2/2006 | Mitomo et al. | |
| 2011/0080835 A1* | 4/2011 | Malomsoky et al. | 370/241 |

FOREIGN PATENT DOCUMENTS

| | | |
|---|---|---|
| JP | 2005-532606 A | 10/2005 |
| JP | 2006067279 A | 3/2006 |
| RU | 200520655 A | 1/2006 |
| WO | 2004070590 A1 | 8/2004 |

OTHER PUBLICATIONS

MLA Keim, Daniel A., et al. "Monitoring network traffic with radial traffic analyzer." Visual Analytics Science and Technology, 2006 IEEE Symposium on. IEEE, 2006.*

Finding Error Handling Bugs in OpenSSL Using Coccinelle, Lawall, J. ; Laurie, B. ; Hansen, R.R. ; Palix, N. ; Muller, G. Dependable Computing Conference (EDCC), 2010 European DOI: 10.1109/EDCC.2010.31 Publication Year: 2010.*

\* cited by examiner

SOFTWARE VULNERABILITY EXPLOITATION SHIELD

CROSS-REFERENCE TO RELATED APPLICATIONS

This application claims priority to and the benefit of U.S. Provisional Application No. 60/785,723 filed Mar. 24, 2006, and entitled SOFTWARE VULNERABILITY EXPLOITATION SHIELD, which is incorporated herein by reference in its entirety.

BACKGROUND

The Internet is a colossal computing network open to hundreds of millions of computers and users. The Internet's community of users is constantly engaged in research, innovation and dialog about computer security vulnerabilities.

A vulnerability is a weakness in a piece of software that can be exploited by ("malicious code"). Some users ("malefactors") seek to use malicious code to exploit vulnerabilities. But the crafting of malicious code is not easy. Usually, only a very talented programmer is capable of writing malicious code that is effective at exploiting a given vulnerability, and usually that programmer must toil tediously for some time to create competent malicious code.

Often, when a talented programmer creates an example of malicious code, he or she posts it publicly on the Internet so that others including malefactors can inspect, test, critique and use it. Within the community of Internet users, the examples of malicious code effective at exploiting any specific vulnerability are usually few in number. A single example of malicious code is commonly borrowed and used by many different malefactors who incorporate it (e.g., "cut and paste" it) into a number of diverse packages, such as an image file or a web site designed to perform a "drive-by download". They may also bundle it with a number of different payloads, such as a rootkit or a keystroke logger.

In theory, many vulnerabilities exist inside most complex software products such an operating system (e.g., Windows® published by Microsoft Corporation). A given vulnerability, however, is unknown until a researcher discovers it. Nevertheless, upon discovering a particular vulnerability, the natural inclination of a researcher is to share the discovery publicly, either by talking about it or by attempting to exploit it in a way that can be monitored publicly. Rarely is the discovery of a particular vulnerability kept a secret for long. News spreads and becomes available on Internet bulletin boards and chat rooms or from public monitoring of new exploits.

Typically, once the publisher of the affected software product learns of the vulnerability, they undertake to design, write, test and release a software "patch" to close off this known vulnerability. The patching process, however, is fraught with delay and hence a "risk window" arises.

For example, as a patch is released, the publisher makes it available to computer owners via Internet downloading or other distribution so that they may install it on their computers. For owners of computers running vulnerable software, the preparation, distribution, and installation of a patch can be a painfully slow and arduous process. For instance, time passes as the software publisher works on the patch. Then the installation of the patch may require manual action on the part of the owner, which can be a burden on an enterprise owning hundreds or thousands of computers. Further, owners such as enterprises often must test the patch before installing it on many of their computers and sometimes a patch will conflict with desired functions of other applications. Additional time may also pass if a publisher discovers after it releases a patch that it is faulty and must be recalled, revised, and reissued.

After a vulnerability becomes known in the community, well-crafted malicious code capable of infecting particular computers is developed and deployed before the software on them is patched. Malefactors seek to trespass through this risk window and some programmers endeavor to help them. Accordingly, once a vulnerability becomes known, talented programmers typically race to create and publish malicious code so as to maximize the time available within the risk window.

Until now, many types of security software such as antivirus software have attempted to stop a particular example of malicious code by looking for a sequence of bytes in the binary file (i.e., signature) that uniquely identifies the structure of the programming code in the example. Typically, such examination of files or other code occurs at the application layer in the Open Systems Interconnection (OSI) model. More specifically, the scanning of viruses is performed on the files after being stored in the file system or while held in memory on the computing system. Although these systems work well for most viruses, through the use of exploited vulnerabilities, malicious code can be entered into the targeted computer at deeper levels than the application layer. As such, the malefactors exploiting such software vulnerabilities can cause the malicious code to be executed before typical security software can detect it and take action.

BRIEF SUMMARY

The above-identified deficiencies and drawback of current software security systems are overcome through example embodiments of the present invention. For example, embodiments described herein provide for narrowing the risk window for computers that are potential targets of malefactors by monitoring for malicious code at a transport layer. Note that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One embodiment provides a mechanism for minimizing the exploitation of vulnerabilities on software installed on a computing system by inspecting network traffic thereto and identifying malicious code before it can be executed and/or installed. At a transport layer (e.g., transmission communication protocol (TCP) sockets layer), network traffic is monitored using a security component installed thereon. When a message destined for the computing system is received, data included in the message is compared with exploit evidence used to identify malicious code. The exploit evidence is provided to the security component by a security service that gathers information about the malicious code. Such exploit evidence may include such things and a signature of the code, Internet Protocol (IP) address associated with the code, unique resource locator (URL) of a website known to provide malicious code, and other factors.

Based on the comparison of data in the message with the exploit evidence, rules are identified that instruct the security component to take action on the message received. For example, if the comparison indicates that the message includes or potentially includes malicious code, the security component may block the message received from entering the computing system, while allowing other traffic to flow thereto. Alternatively, or in addition, the security component may notify the user (e.g., through a user interface) about the potential risk of the message as including malicious code, thus allowing the user to take the appropriate action. In another embodiment, the security component can disable any harmful features of the malicious code. If, on the other hand, the comparison at the transport layer of the message to the exploit evidence does not indicate that the message includes or is otherwise associated with malicious code, then the message may be allowed to pass to the computing system.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantageous features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for narrowing the risk window for computers that are potential targets of malefactors by monitoring for malicious code at a transport layer. The embodiments of the present invention may comprise a special purpose or general-purpose computer including various computer hardware or modules, as discussed in greater detail below.

As previously mentioned, embodiments of the present invention overcome the above identified drawbacks and deficiencies of security software systems by narrowing the risk window for computers that are potential targets of malefactors. Under this embodiment, the owners of target computers install Security Components of an ongoing Security Service, which monitors news, discussion, technical developments and other information on the Internet or elsewhere about new vulnerability discoveries and new examples of malicious code. When the Security Service finds an example of malicious code, it gathers information about the malicious code in order to appropriately identify it. For example, the Security Service may inspect its data structure seeking to ascertain a signature for it. In addition, the Security Service can determine the source of the malicious code by identifying its IP address, URL, or other electronic address. In fact, there may be numerous information that the Security Service can use to identify the malicious code.

Once information about the malicious code is gathered, this information is used to create security updates including exploit evidence and security commands that are then distributed to installations of the Security Component. Each Security Component uses the exploit evidence and security commands for inspecting Internet or network data traffic flowing to the computer at the transport layer (e.g., TCP socket level), looking for the messages that match the exploit evidence. By inspecting data at the transport level, the Security Component can spot malicious code before any application or other software on the computer can execute or install it. Further, the Security Component can monitor and identify malicious code designed to exploit software vulnerabilities of most any application installed on the computing system.

If the Security Component finds a data transmission that matches the exploit evidence, it can execute any of a number of protective measures. For example, it may block that particular transmission from entering the computer, while allowing other transmissions to pass and/or it may inform the computer user about the data transmission so that the user can take appropriate action. It can also modify the transmission so that any harmful features are disabled.

As time passes after the Security Component is installed, it could become unwieldy. It could be looking for so many signatures, electronic addresses, or other exploit evidence that it slows performance of the computer on which it is installed, and it could potentially conflict with desired functions and transmissions. Accordingly, to minimize this problem, other example embodiments described herein below provide various options to limit the monitoring.

Note that the above embodiments differ significantly from typical firewall systems and Web content filters. For example, firewalls only perform packet inspection to look at the protocols, sources, and destination to make binary decisions of allowance or disallowance of such traffic. Similarly, Web content filters typically focus on white/black lists of IP address or URLs for allowing or disallowing packets, which embodiments herein also contemplate. Embodiments herein, however, inspect the content of messages searching for malicious code targeted at vulnerabilities in software based on security evidence, commands, and rules generated from a Security Service that continually monitors for such malicious code. In other words, embodiments herein do not simply look at a source of a packet and make a binary decision based thereon, but rather provides a more robust system that continually monitors formation of malicious code and then can create evidence, commands, and rules that can dynamically change and be implemented to appropriately handle such content in a variety of ways as described in greater detail below.

Although more specific reference to advantageous features are described in greater detail below with regards to the Figures, embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described herein are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

Figure 1:
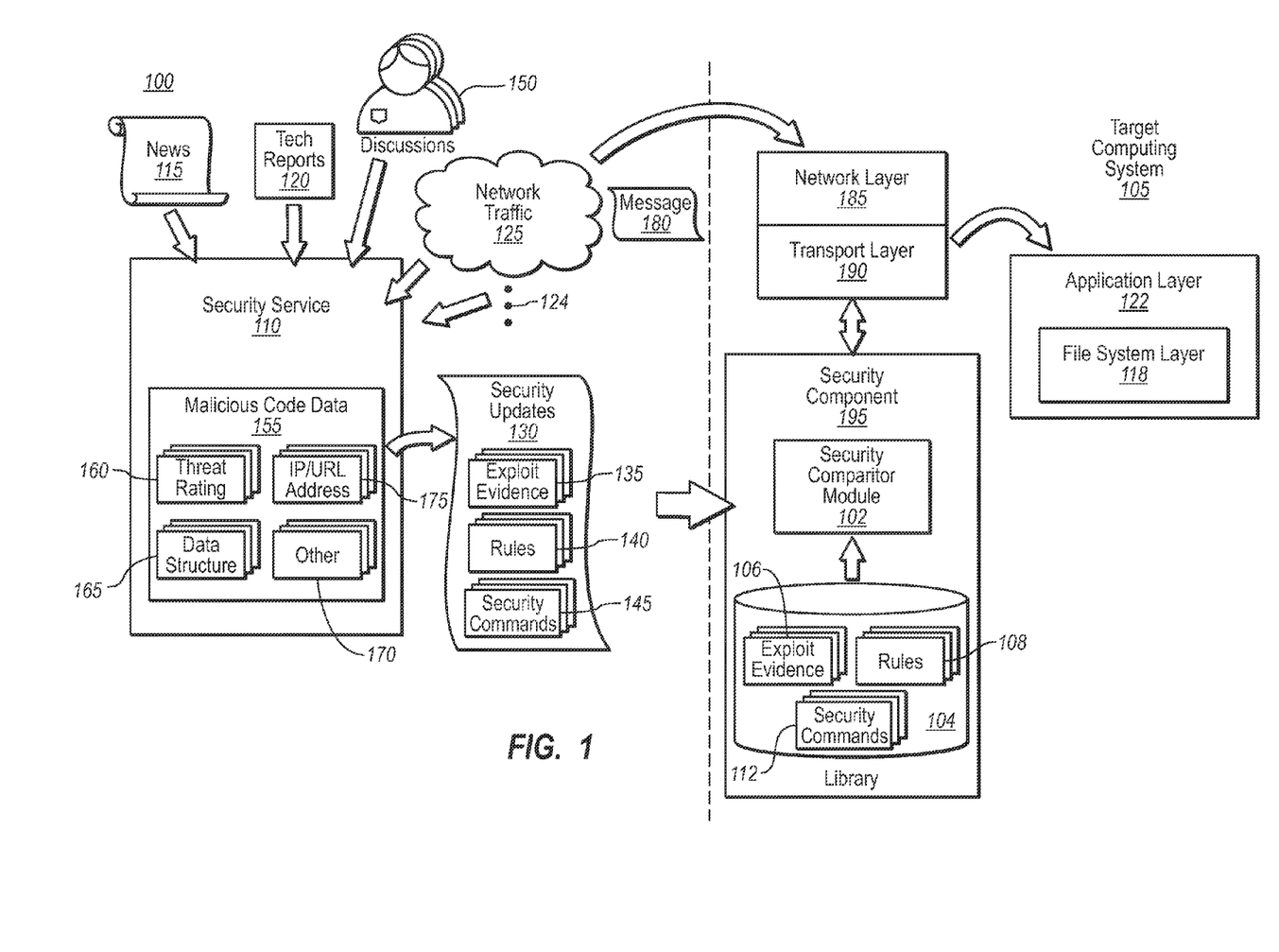
FIG. 1 illustrates a computing network with a security service and security component used to minimize exploitation of software vulnerabilities in accordance with example embodiments.

FIG. 1 illustrates a computing network 100 configured to overcome the above identified drawbacks and deficiencies of current security software systems by narrowing the risk window for computers that are potential targets of malefactors. As shown, target computing systems have installed thereon special Security Components 105 associated with an ongoing Security Service 110. The Security Service 110 continually and/or periodically monitors such things as news 115, discussion 150, technical developments or reports 120, and other information (such as network traffic 125) on the Internet or elsewhere about new vulnerability discoveries and new examples of malicious code. Of course, the sources used to gather information about potential malicious code can vary widely and can include any well known form as indicated by the vertical ellipsis 124.

Further, this monitoring can take various forms, including manual searching and/or reading of Internet or other discussions 150 or automated collection of intelligence such as through probes, honeypots, search bots, etc., that glean relevant statements and code from known or potential circles of malefactors or recorded examples of malefactor behavior, tools, experimentation, etc. Of course, like the sources of information, the mechanisms used for gathering information 155 about malicious code are used herein for illustrative purposes only and are not meant to limit or otherwise narrow embodiments herein unless explicitly claimed.

As the Security Service 10 finds information about malicious code, it can store such data as malicious code data 155. As will be appreciated, the malicious code data 155 can take on many forms as it is gathered from various sources and mechanism. For example, the malicious code data 155 may include information about a data structure 165 for the malicious code. More specifically, Security Service 110 can inspect the data structure of malicious code seeking to ascertain such things as a signature or other representation for it. Each example of malicious code may have a unique data structure 165 or data sequence within it. This unique data can then be used (as described below) for identifying examples of malicious code.

Note that the signature or representation that identifies the malicious code can take on many well known forms. For example, the signature could be either the entire code, or only a portion thereof (e.g., a sequence of bytes or binary string). Further, the signature could be a hash of the code or any portion thereof. In fact, malefactors often try to trick security systems by encrypting portions of the code, creating many variations thereof, or using any number of other devious mechanisms. Accordingly, the term "signature" as used herein should be broadly construed to mean any unique data structure or identifier used to represent malicious code.

In another embodiment, the Security Service 110 also monitors for IP/URL addresses 175 associated with efforts to exploit known vulnerabilities. When it does identify such an IP/URL address, these can also be added as the malicious code data 155, which as will be described below can be communicated to the Security Components 195 for blocking data received from such sources (e.g., by blacklisting). Of course, there may be other 170 malicious code data 155 that can be gathered as will be described in greater detail below.

The malicious code data 155 is used to create security updates 130, which the Security Service 10 distributes to installations of the Security Component 195 for looking for the malicious code. As shown, the security updates 130 may include several pieces of information and code. For example, the security updates may include exploit evidence 135, which can be compared to messages or portions thereof as described in greater detail below. The exploit evidence 135 can include such things as signatures of data structures 165, IP/URL or other electronic addresses 175, and other information 170 gathered from the Security Service 110. The security updates 130 may also include such things as security commands 145 and rules 140, which as described in greater detail below are used by the Security Component 195 to determine such things as to how to use the exploit evidence 135, and what actions to take once malicious code is identified.

The Security Component 195 receives the security updates 130 from the Security Service 110 and modifies its library 104 accordingly. The Security Component 195 then inspects Internet or network data traffic 125 flowing to the computer 105. Embodiments provide for the inspection of such traffic at the transport layer 190, which from an OSI model resides between the network layer 185 and the application layer 122 that includes the file system layer 118. Although there are many other layers in the OSI model, and other abstract models that can be used represent communication channels, the ones shown here are used for simplicity reasons only. Nevertheless, there may be other layers and other models that can be used with embodiments described herein.

Examples of the transport layer 190 include a TCP socket level, which is the end-point, at the target computer 105, of a two-way communication link between two programs running on a TCP network. By inspecting data at the transport layer 190, the Security Component 195 can spot malicious code before any application or other software on the computer can execute or install it in memory or at the file system layer 118. Further, because most, if not all, network traffic for applications flows through the transport layer 190, the Security Component 195 can monitor and identify malicious code designed to exploit software vulnerabilities of most any application installed on the target computing system 105.

For example, as messages 180 are received at the transport layer 190, Security Component 195 uses its security comparator module 102, and optionally the security commands 112, to compare portions of the message 180 with the exploit evidence 106. If the comparator module 102 finds a data transmission matching the exploit evidence 106 or violating policies defined in the security commands 112, the Security Component 195 executes any of a number of protective measures as can be defined by the rules 108. For instance, if the security comparator module identifies message 180 as including a signature, electronic address, or other representations of malicious code as defined by the exploit evidence 106, the Security Component 195 can take the appropriate action defined by rules 108.

In one embodiment, a rule 108 might instruct Security Component 195 to block that particular transmission or message 180 from entering the target computer 105, while allowing other benign transmissions to pass. An alternative embodiment defines a rule 108 that allows the Security Component 195 to inform the computer 105 user about the data transmission so that the user can take appropriate action. Such notification may be in the form of a user interface that provides the user with information about the message (e.g., source, violation, potential for risk, etc.) and an option to take action (e.g., delete, allow, quarantine, hold, etc.). In still another embodiment, a rule 108 may instruct the Security Component 195 to modify the transmission or message 180 so that any harmful features are disabled or otherwise eliminated. For example, the Security Component 195 may automatically remove the portion of the message that contains the malicious code or disable the harmful features within the code itself.

Of course, there may be any number of actions that can be taken in any combination as defined by the rules 108. For example, the rules 108 may first remove or disable the harmful features of a message 180 prior to informing the user about the transmission 108. Further, the rules 108 may be set or modified by the user of the target system 105, set or modified by the Security Service 110, be default programming on the Security Component 195, or be set or modified using any well known manner. Accordingly, any specific use of an action or how that action is set or applied is used herein for illustrative purposes only and is not meant to limit or otherwise narrow the scope of embodiments described unless otherwise explicitly claimed.

As mentioned above, as time passes after the Security Component 195 is installed, it could become unwieldy. It could be looking for so many signatures, electronic addresses, and other exploit evidence 106 that it slows performance of the computer 105 on which it is installed, and it could potentially conflict with desired functions and transmissions. Accordingly, to minimize this problem, example embodiments described herein provide various options.

One example option provides for attending to only exploit evidence 106 for malicious code that is especially worrisome. The Security Service 110 evaluates discovered examples of malicious code to determine how likely it is to yield a serious threat to targeted computers. This evaluation might include review of the nature and scope of the relevant vulnerability, the quality of the workmanship used to write the example Code, and so on. The Service 110 then makes and distributes threat ratings 160 within security updates 130 and/or any necessary commands 145 for looking for exploit evidence 106 of only those examples of code that the Security Service 110 judges to be most harmful. For example, a threshold threat rating 160 may be used to determine if exploit evidence 135 will or will not be included in the security update 130. Of course, there may be any number of ways of judging what exploit evidence 135, security commands 112, or rules 140 should be included or excluded from the security updates 130 based on such threat ratings 160.

Another embodiment provides for cancelling, deleting, temporarily pausing, or performing similar actions on the exploit evidence 106, security commands 112, and/or rules 108 on the Security Component 195 after the relevant risk window has closed or if the threat rating 160 falls below some set threshold. For example, the risk window might close as a result of wide distribution of a competent and trusted patch. Or, it might close because experience reveals the relevant example of malicious code to be harmless. Accordingly, after the Security Service 110 publishes security updates 130 to installations of the Security Component 195, it continues to monitor the subsistence of the relevant vulnerability and malicious code within the Internet community. When the Service 110 makes a judgment that the relevant risk window is minor or nonexistent, the Service 10 issue a threat rating 160 that can be used to send commands 145 to Security Components 195 installations that they should no longer monitor for the exploit evidence 106. Of course, for some signatures, electronic addresses, or other malicious code data 155 the risk window may never close, in which case the Security Service 110 may elect never to cancel the monitoring of that exploit evidence 106.

Of course, there may be many other mechanisms for enhancing the performance of the Security Component 195. For example, the Security Service 110 may send security commands 145 and rules 140 to the Security Component 195 that instruct it to delete, cancel, hold, or perform some other action on exploit evidence 106 and/or any security commands 112 or rules 108 associated therewith based on the occurrence of an event. As such, the Security Component 195 monitors the system for the occurrence of such events, and then takes the appropriate action as defined by the commands 145 and/or rules 140. Such events may be based on the expiration of time or on such things as the Security Component 195 determining that the threat rating 160 for the exploit evidence 106 or malicious code associated therewith is low. In fact, there may be any number of events that can be used to take action for enhancing the performance of the Security Component 195. Further, there may be any number of actions such as delete, cancel, pause, hold, etc., that may be performed upon the occurrence of the event. Accordingly, any specific event and/or action taken as describe herein is used for illustrative purposes and is not meant to limit or otherwise narrow embodiments described unless otherwise explicitly claimed.

The following describes some specific examples of various implementations that can be used in accordance with example embodiments. These implementations are only examples of how the solution can be applied. They are not the only possible examples or implementations and are therefore not meant to limit or otherwise narrow the scope of embodiments described herein unless explicitly claimed.

Security Component 195 is installed on a user's personal computer 105 running the Microsoft Windows XP® operating system. Security Service 10 is permitted to securely send updates 130 to the Security Component 195. When a researcher announces on the Internet discovery of a previously unknown vulnerability in Microsoft Windows XP®, Security Service 10 reads discussions about it among programmers/hackers on the Internet. The Service 110 observes that one programmer posts code for exploiting the vulnerability. Accordingly, the Security Service 110 tests the code and determines that it appears likely to be a threat to computers running Windows.

From the code, the Security Service 110 ascertains a signature, i.e., a unique data structure that identifies the code.

The Security Service 110 sends exploit evidence 135, rules 140, and commands 145 to the Security Component 195 installed on the user's computer to monitor for the signature. The Security Component 195 searches for the signature in the Internet data traffic sent to the user's computer. Searching at the transport layer 190 (e.g. TCP socket level) of the data traffic, the Component 195 looks for the signature regardless of the data package it may be in or the payload it may carry. The Security Component 195 finds the signature, combined with a rootkit payload, in incoming e-mail data traffic 180. The Security Component 195 blocks the unit of data including the signature. The data is blocked before any software on the user's computer is able to execute or install the rootkit.

By way of another example, a user installs Security Component 195 on her personal computer running the Mozilla Firefox® Internet Browser version 1.5.0.1 for Microsoft Windows® (the "Browser"). Security Service 10 is permitted to securely send updates 130 to the Security Component 195. Service 10 plants and maintains various automated honeypots, probes, and other computers on the Internet to collect examples of malicious code and learn the source and other information about such code. Some of the probes, installed with the Browser, automatically visit many web sites in search of malicious code.

Shortly after a researcher announces discovery of a certain vulnerability in the Browser, a server at a particular IP address (the "Rogue Address") sends to several of the Security Service's probes a Trojan bundled with malicious code that exploits the vulnerability. In response, the Security Service 10 sends security updates 130, which may include exploit evidence 135 and commands 145 to the Security Component 195 installed on the user's computer 105 to monitor for the Rogue Address as the source of data being transmitted to the user's computer 105. The Security Component 195 searches, at the TCP socket level 190, for the Rogue Address in the Internet data traffic 180 sent to target computer 105. The publisher of the Browser issues a patch to close the relevant vulnerability. The Security Service 110 determines that the Rogue Address is no longer a threat to a computer running the Browser and transmits security updates 130 to the Security Component 195 to cease searching for the Rogue Address.

The present invention may also be described in terms of methods as comprising functional steps and/or non-functional acts. The following is a description of steps and/or acts that may be performed in practicing the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts in the recitation of the claims—and in the following description of the flow diagram for FIG. 2—is used to indicate the desired specific use of such terms.

Figure 2:
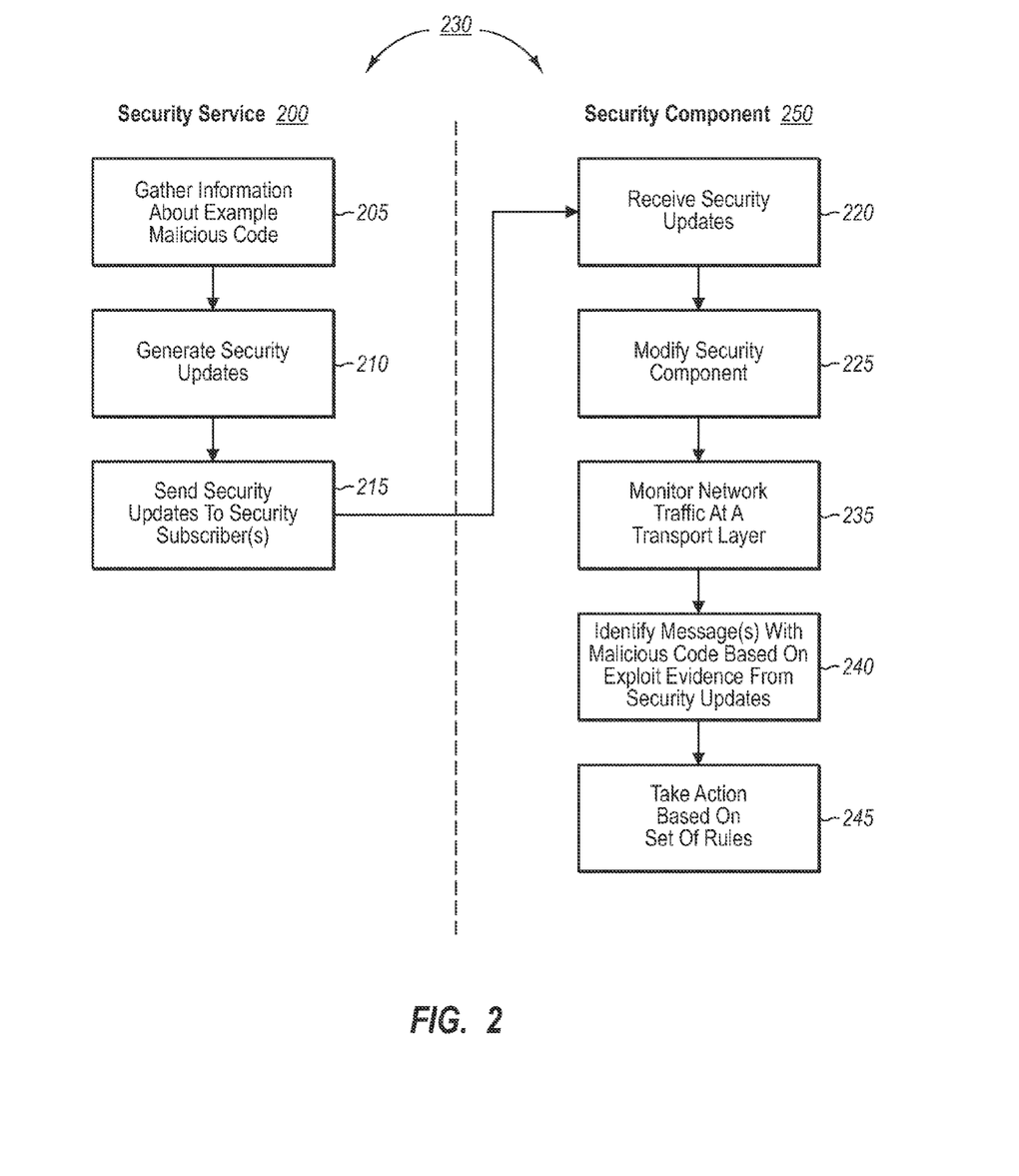
FIG. 2 illustrates flow diagrams for implementing a method of reducing a risk window for computers that are potential targets of malefactors in accordance with example embodiments.

As previously mentioned, FIG. 2 illustrates a flow diagram for various exemplary embodiments of the present invention. The following description of FIG. 2 will occasionally refer to corresponding elements from FIG. 1. Although reference may be made to a specific element from this Figure, such references are used for illustrative purposes only and are not meant to limit or otherwise narrow the scope of the described embodiments unless explicitly claimed.

FIG. 2 illustrates a flow diagram of a method 230 for narrowing the risk window for computers that are potential targets of malefactors. On the Security Service 200, method 230 includes an act of gathering 205 information about example malicious code. For instance, Security Service 10 may monitor and gather news 115, discussions 150, technical developments 120, network traffic 125, or other information from the Internet or other areas about new (or old) vulnerability discoveries and/or new (or old) examples of malicious code. As previously mentioned, this gathering of information can take on many forms, including manual searching and reading of Internet discussions or automated collection of intelligence as such as through probes, honeypots, search bots, etc. that glean relevant statements and software from known or suspected malefactors or recorded examples of malefactor behavior, tools, or experimentation.

Based on the information gathered, method 230 further includes an act of generating 210 security updates. For example, Security Service 110 may use the malicious code data 155 to generate security updates 130. Such security updates 130 comprise exploit evidence 135, rules 140, and/or security commands 145, which are used to identify such things as signatures, electronic addresses, or other information about malicious code and take appropriate action thereon.

Method 230 also includes an act of sending 215 the security updates to the security subscribers. On the Security Component side 250, method 230 further includes an act of receiving 220 the security updates. Based on the security updates, method 230 includes an act of modifying 225 security component 250. For example, Security Service 110 sends the security updates 130 to the target computing system 105, which updates the security component 195 library 104 with the appropriate exploit evidence 106, rules 108, and security commands 112.

Method 230 further includes an act of monitoring 235 network traffic at a transport layer. For example, before, after, or during, the receipt of the security updates 130, Security Component 195 can monitor network traffic 125 at transport layer 190 (e.g., TCP socket level), which is the end-point, at the target computer 105, of a two-way communication link between two programs running on the network. By inspecting data at the transport layer 190, the Security Component 195 can spot malicious code before any application or other software on the computer can execute or install it in memory or at the file system layer 118. Further, because most, if not all, network traffic for applications flows through the transport layer 190, the Security Component 195 can monitor and identify malicious code designed to exploit software vulnerabilities of most any application installed on the target computing system 105.

Method 230 also includes a step for identifying 240 message(s) with malicious code based on exploit evidence from security updates. For example, Security Component 195 may perform an act of receiving message 180 at the transport layer 190 and use security comparison module 102 for an act of comparing data within the message 180 with exploit evidence 106. Based on the comparison, Method 230 then includes a step for taking action 245 based on a set of rules. For example, if Security Component 195 performs an act of identifying that the message 180 corresponds to malicious code, then a rule 108 might instruct it to block that particular transmission or message 180 from entering the target computer 105. Even though the rule 180 blocks such message 180 it may allow other benign transmissions to pass. An alternative embodiment provides a rule 108 that allows the Security Component 195 to inform the computer 105 user about the data transmission so that the user can take appropriate action. In still another embodiment, a rule 108 may instruct the Security Component 195 to modify the transmission or message 180 so that any harmful features are disabled or otherwise eliminated.

In order to enhance performance of the Security Component 195 other embodiments are needed. Accordingly, one embodiment for attending to only exploit evidence 106 for malicious code that is above a threat ratings 160, which is a determination of how harmful a particular malicious code might be. Another embodiment provides for cancelling, deleting, holding, or other action to the exploit evidence 106, security commands 112, and/or rules 108 on the Security Component 195 after the relevant risk window has closed or if the threat rating 160 falls below some set threshold.

In still another embodiment, the Security Component 195 may receive a command 145 and/or rule 140 that instruct it to delete, cancel, or take some other action on exploit evidence 106 and/or any security commands or rules 108 associated therewith based on the occurrence of an event. As such, upon the occurrence of the desired event, the Security Component 195 can take an appropriate action on the exploit evidence 106, security commands 112 and rules 108 associated therewith such as deleting them, canceling them, temporally pause them, etc.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method of minimizing exploitation of vulnerabilities in software installed on a target computer, the method comprising:
    monitoring, by the target computer, incoming network traffic identified as being destined for the target computer solely at a transport layer of the target computer;
    receiving, by the target computer, a security update, wherein the security update is generated by an external security service using information gathered while automatically searching one or more Internet sources using one or more probes to collect one or more examples of malicious code, to learn a source, and to learn other information about each of the one or more examples of malicious code, wherein the external security service plants and maintains at least one probe installed with a browser on the target computer, wherein the at least one probe automatically visits web sites in search of the examples of malicious code, and wherein the security update comprises:
        one or more security commands that define one or more security policies,
        exploit evidence used to identify malicious code, wherein the exploit evidence comprises at least one of information about the malicious code, a signature of the malicious code, an internet protocol address associated with the malicious code, a unique resource locator of a website known to provide the malicious code, and a list of known electronic addresses associated with the malicious code,
        one or more rules associated with the exploit evidence, and
        a threat rating for the exploit evidence;
    updating, by the target computer, a library associated with a security component with the security update;
    receiving, by the target computer, a message identified as destined for the target computer at the transport layer as part of the network traffic;
    comparing, by the target computer, at least a portion of data included in the message with the exploit evidence to determine whether the message matches the exploit evidence or violates one or more of the security policies defined by one or more of the security commands; and
    in response to the message matching at least a portion of the exploit evidence or violating one or more security policies defined by the one or more of the security commands:
        performing, by the target computer, one or more actions on the message according to the rules so that malicious code in the message is not transferred to the application layer of the target computer,
        notifying, by the target computer, a user of the malicious code, and
        evaluating the message to determine if the message is harmful; and
    in response to the threat rating falling below a threshold value identifying the message as harmful, performing one or more of the following:
        canceling, by the target computer, the exploit evidence,
        deleting, by the target computer, the exploit evidence from the library, and
        temporarily pausing, by the target computer, the comparing of the data with the exploit evidence.

2. A method of minimizing exploitation of vulnerabilities in software installed on a target computer, the method comprising:
    receiving, by a security component of the target computer, a security update, wherein the security update is generated by a security service located externally from the target computer using information gathered while automatically searching one or more Internet sources using one or more probes to collect one or more examples of malicious code, to learn a source, and to learn other information about each of the one or more examples of malicious code, wherein the external security service plants and maintains at least one probe installed with a browser on the target computer, wherein the at least one probe automatically visits web sites in search of the examples of malicious code, and wherein the security update comprises:
        one or more security commands that define one or more security policies,
        exploit evidence used to identify malicious code, wherein the exploit evidence comprises at least one of information about the malicious code, a signature of the malicious code, an internet protocol address associated with the malicious code, a unique resource locator of a website known to provide the malicious code, and a list of known electronic addresses associated with the malicious code,
        one or more rules that instruct the security component how to use the exploit evidence, and
        a threat rating for the exploit evidence;
    updating, by the target computer, a library with the security update;
    monitoring, by the target computer, solely at a transport layer of the target computer, incoming network traffic identified as being destined for the target computer using the security component, wherein the incoming network traffic comprises a message destined for an application layer of the target computer performing the monitoring, wherein the incoming network traffic is intended to instruct a software application installed on the target computer to execute or install the malicious code;

comparing, by the target computer, at least a portion of data included in the message received with the exploit evidence to determine whether the message matches the exploit evidence or violates one or more of the security policies defined by one or more of the security commands;

based on the comparison with the exploit evidence:
identifying, by the target computer, the at least a portion of data as corresponding to the malicious code,
taking an action on the message, by the target computer, wherein the action is specified in the rules,
blocking, by the target computer prior to the application layer of the target computer, the portion of data corresponding to the malicious code before any software applications installed on the target computer execute or install instructions contained in the data, and
evaluating the message to determine if the message is harmful;
and
in response to the threat rating falling below a threshold value identifying the message as harmful, performing one or more of the following:
canceling, by the target computer, the exploit evidence,
deleting, by the target computer, the exploit evidence from the library, and
temporarily pausing, by the target computer, the comparing of the data with the exploit evidence.

3. The method of claim 1, wherein the transport layer comprises a TCP socket of the target computer.

4. The method of claim 3, wherein the comparison identifies the at least a portion of data as corresponding to the malicious code, and the one or more rules instruct the target computer to modify the message in order to disable any harmful features of the malicious code.

5. The method of claim 3, wherein the comparison identifies the at least a portion of data as corresponding to the malicious code, and the one or more rules instruct the target computer to allow other benign messages to pass to the computing device, while blocking the message received.

6. The method of claim 3, wherein the comparison identifies the at least a portion of data as corresponding to the malicious code, and the one or more rules instruct the target computer to inform the user of the computing device about the correspondence of the message using a user interface and allowing the user to either accept or reject the message.

7. The method of claim 1, wherein the electronic address list includes IP addresses or URLs for websites and wherein an IP address or a URL for a source of the message is compared to the list of known electronic addresses associated with malicious code.

8. The method of claim 1, wherein the signature comprises unique data structures that represent the malicious code.

9. The method of claim 2, wherein the signature of the malicious code comprises unique data structures that represent the malicious code.

10. The method of claim 2, wherein the Internet sources comprise on or more of the following:
news sources;
discussion sources; and
technical reports.

11. The method of claim 2, wherein the transport layer comprises a TCP socket of the target computer.

12. The method of claim 2, wherein the comparison identifies the at least a portion of data as corresponding to malicious code, and the one or more rules instruct the target computer to modify the message in order to disable any harmful features of the malicious code.

13. The method of claim 2, wherein:
the one or more security commands indicate that the exploit evidence should expire based on one or more events; and
upon occurrence of the one or more events, taking action, by the target computer, on the exploit evidence as defined by the rules.

14. The method of claim 13, wherein the event comprises determining that a risk window has passed, wherein the action is one or more of the following:
canceling the comparing of the exploit evidence,
deleting the exploit evidence from the security component, and
temporarily pausing the comparing of the data with the exploit evidence.

* * * * *